United States Patent
Kahler et al.

(10) Patent No.: US 6,526,876 B2
(45) Date of Patent: Mar. 4, 2003

(54) HANDLE FOR COOKWARE

(75) Inventors: Andrew Kahler, Fortson, GA (US);
John R. Holman, Columbus, GA (US);
Ryan Neal, Midland, GA (US)

(73) Assignee: W. C. Bradley Company, Columbus, GA (US)

( * ) Notice: Subject to any disclaimer, the term of this patent is extended or adjusted under 35 U.S.C. 154(b) by 0 days.

(21) Appl. No.: 10/164,183

(22) Filed: Jun. 5, 2002

(65) Prior Publication Data

US 2003/0005827 A1 Jan. 9, 2003

Related U.S. Application Data

(60) Provisional application No. 60/295,976, filed on Jun. 5, 2001.

(51) Int. Cl.[7] ............................. A23L 1/00; A47J 37/08; A47J 45/00
(52) U.S. Cl. ......................... 99/394; 16/110.1; 16/434; 99/395; 99/397; 294/6; 294/33
(58) Field of Search ........................... 99/394, 393, 395, 99/400, 397, 401, 419, 402, 421 A, 421 H, 426, 449, 450; 16/110.1, 422, 425, 434, 426, 429; 294/6, 7, 33, 31.1; D7/395, 690; 126/14, 30; 403/94

(56) References Cited

U.S. PATENT DOCUMENTS

| | | | | |
|---|---|---|---|---|
| 353,339 A | * | 11/1886 | White ..................... 99/394 X |
| 462,048 A | * | 10/1891 | Jenne ........................ 99/394 X |
| 476,508 A | * | 6/1892 | Barnett ........................ 99/394 |
| 476,916 A | * | 6/1892 | Briggs ......................... 99/394 |
| 498,984 A | * | 6/1893 | Monachesi ................ 126/14 X |
| 547,593 A | * | 10/1895 | Wagoner .................. 99/397 X |
| 1,463,541 A | * | 7/1923 | Andrews, Jr. ............. 16/434 X |
| 2,297,825 A | * | 10/1942 | Bobo ........................ 99/397 X |
| 3,220,335 A | * | 11/1965 | Rodrigue .................. 99/400 X |
| 5,048,882 A | * | 9/1991 | Fielding ....................... 294/33 |
| 5,755,153 A | * | 5/1998 | Su ................................ 99/395 |
| 5,823,589 A | * | 10/1998 | Johnston ........................ 294/7 |
| 6,386,094 B1 | * | 5/2002 | Stevenson et al. ........ 99/394 X |

* cited by examiner

*Primary Examiner*—Timothy F. Simone
(74) *Attorney, Agent, or Firm*—James W. Kayden; Thomas, Kayden, Horstemeyer & Risley, LLP

(57) ABSTRACT

A rotatable handle for use with an associated cookware item including an attachment member having a proximal end and a distal end, the proximal end being rotatably secured to a first portion of the cookware item and the distal end having a gripping member disposed thereon. The first portion also includes a handle locking member. A locking mechanism is slidably disposed on the attachment member between the gripping member and the proximal end, the locking mechanism being arranged and configured to engage the handle locking member and being slidable between a first position and a second position. When the locking mechanism is in the first position, the handle is rotatable relative to the first portion. When the locking mechanism is in the second position, the locking mechanism engages the handle locking member, thereby securing the handle relative to the cookware item.

12 Claims, 6 Drawing Sheets

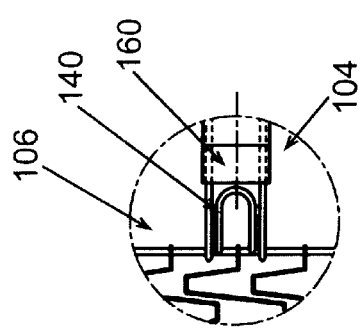
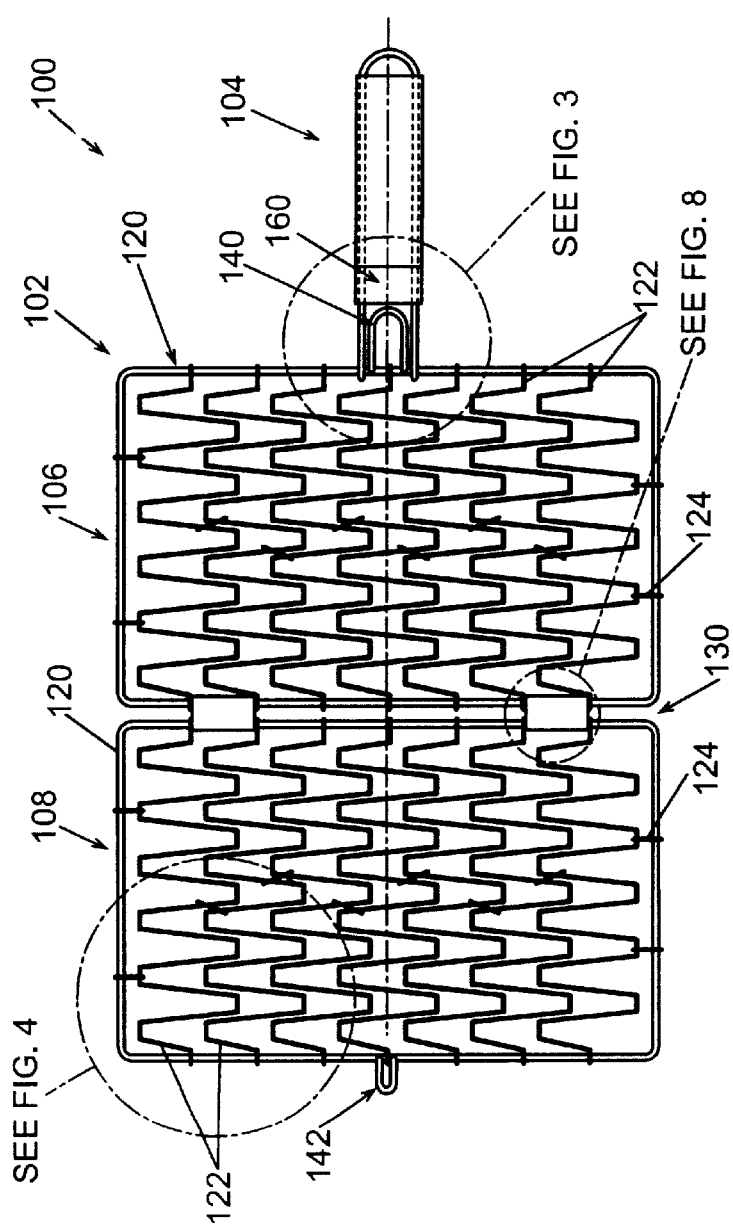
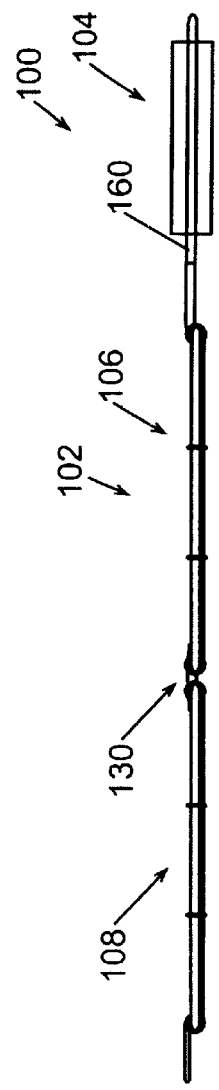

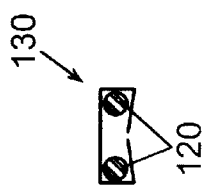
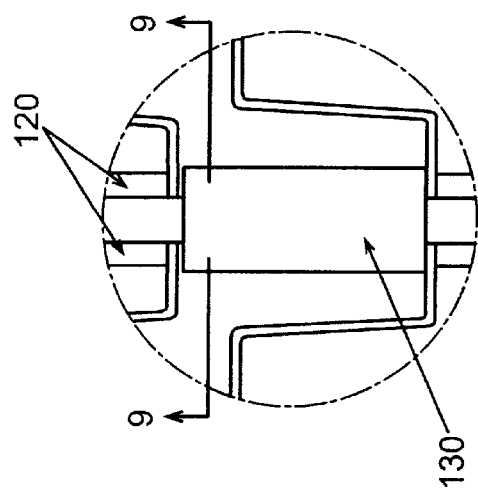
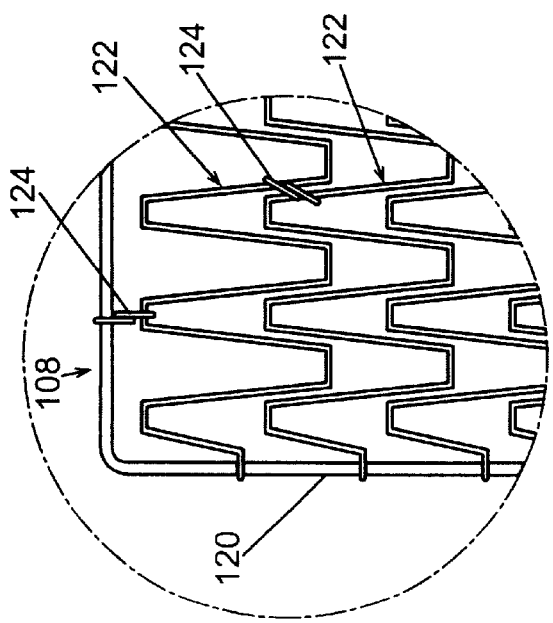
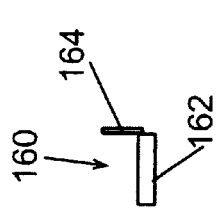
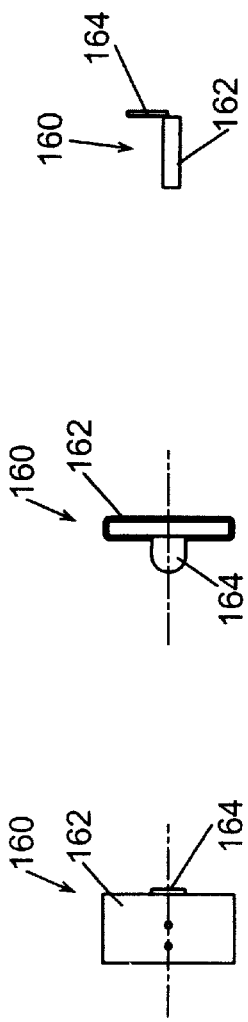

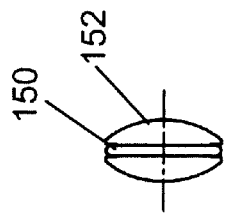
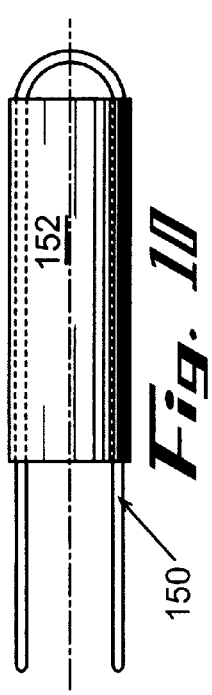
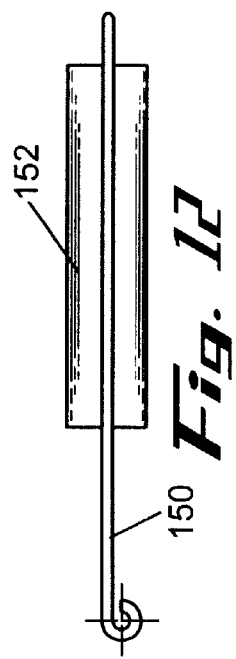
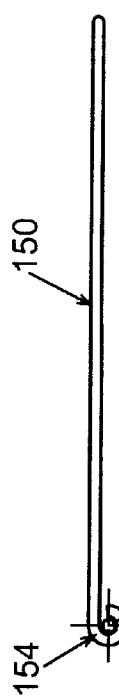
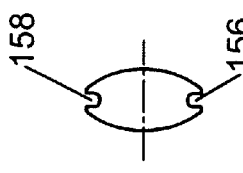
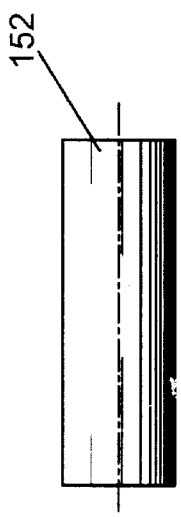
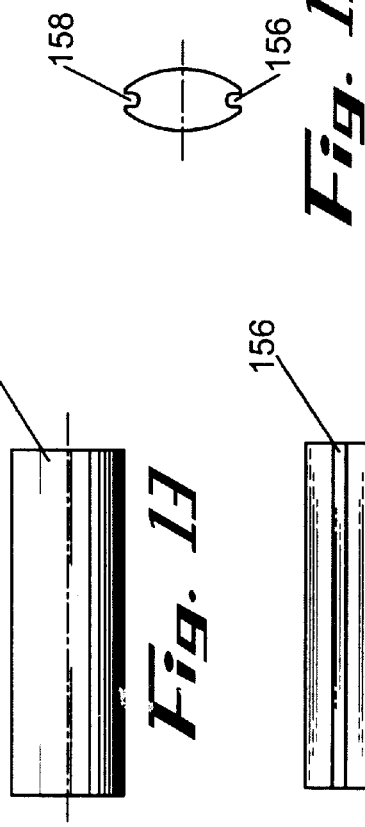

HANDLE FOR COOKWARE

CROSS-REFERENCE TO RELATED APPLICATION

This application claims priority to copending U.S. provisional application entitled, "Handle for Cookware," having Ser. No. 60/295,976, filed Jun. 5, 2001, which is entirely incorporated herein by reference.

FIELD OF THE INVENTION

The present invention generally relates to cooking devices. More specifically, the present invention relates to baskets that can be used for cooking food with outdoor grills.

BACKGROUND OF THE INVENTION

Typically, cookware items come with a fixed handle that extends radially from the cookware item. Such cookware items include cooking baskets, skillets, woks, baking pans, and other such devices. The radially extending handle presents a number of problems for manufacturers, retailers and purchasers. For example, because the handle extends beyond the cookware item, relatively large packaging must be used during shipping. This translates to increased costs for the manufacturer not only because of the greater amounts of packaging materials used, but also because of the increased costs of shipping due to each unit shipped requiring a larger volume. Increased package volume also increases the costs of presenting the cookware items to consumers in that both increased shelf space and warehouse space are required to display and store the items. Ultimately, consumers suffer because the increased costs of the manufacturers and retailers are frequently passed along in the price of the item. As well, the radially extending handles require greater space when the cookware item is in use, on a stove, grill, etc., and during storage. Furthermore, radially extending handles raise safety concerns when allowed to extend beyond the edge of the cooking surface being used in that spill type accidents are possible.

Thus a heretofore unaddressed need exists to address the aforementioned deficiencies and inadequacies.

SUMMARY OF THE INVENTION

In accordance with the present invention, a handle is provided that rotatably attaches to an associated cooking item. An embodiment of the handle comprises an attachment member having a proximal end and a distal end, the proximal end being rotatably secured to a first portion of the cookware item and the distal end having a gripping member disposed thereon. The first portion also includes a handle locking member. A locking mechanism is slidably disposed on the attachment member between the gripping member and the proximal end, the locking mechanism being arranged and configured to engage the handle locking member and being slidable between a first position and a second position. When the locking mechanism is in the first position, the handle is rotatable relative to the first portion. When the locking mechanism is in the second position, the locking mechanism engages the handle locking member, thereby securing the handle relative to the cookware item.

These and other objects and advantages of the present invention will become apparent upon reading the following description, the illustrative embodiments describing the principles of the present invention with reference to the attached drawings, wherein like reference numerals have been used to refer to like parts throughout the several figures.

BRIEF DESCRIPTION OF THE DRAWINGS

The invention can be better understood with reference to the following drawings. The components in the drawings are not necessarily to scale, emphasis instead being placed upon clearly illustrating the principles of the present invention.

FIG. 1 is a plan view of an embodiment of a cooking basket shown in an open position, with the present handle assembly shown in an extended position.

FIG. 2 is a side view of the basket of FIG. 1;

FIG. 3 is a cutaway, plan view of the embodiment of FIG. 1 showing detail of a locking assembly.

FIG. 4 is a cutaway, plan view of the embodiment of FIG. 1 showing assembly detail of a panel of the basket assembly.

FIG. 5 is a plan view of an embodiment of a locking mechanism.

FIG. 6 is an end view of the locking mechanism of FIG. 5.

FIG. 7 is a side view of the locking mechanism of FIGS. 5 and 6.

FIG. 8 is a plan view of the embodiment of FIG. 1 showing detail of a hinging mechanism.

FIG. 9 is a cutaway, end view of the hinging mechanism of FIG. 8.

FIG. 10 is a plan view of the handle of FIG. 1.

FIG. 11 is an end view of the handle of FIG. 10;

FIG. 12 is a side view of the handle of FIGS. 10 and 11.

FIG. 13 is a plan view of the gripping member of FIG. 1.

FIG. 14 is a side view of the gripping member of FIG. 13.

FIG. 15 is an end view of the gripping member of FIGS. 13 and 14.

FIG. 16 is a plan view of the handle mounting mechanism of FIG. 1.

FIG. 17 is a side view of the handle mounting mechanism of FIG. 16.

Figure 18:
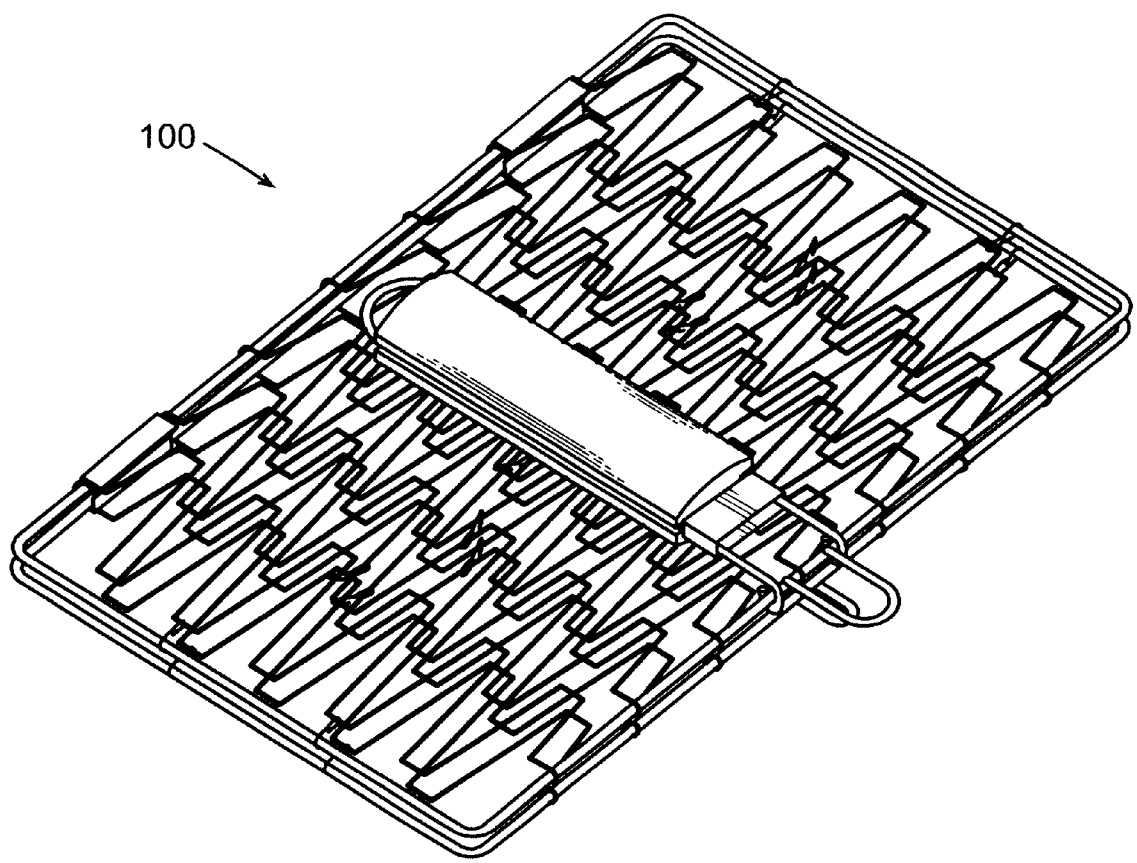
FIG. 18 is a perspective view of the basket of FIG. 1 in the closed position, with the handle assembly in a retracted position.
Figure 19:
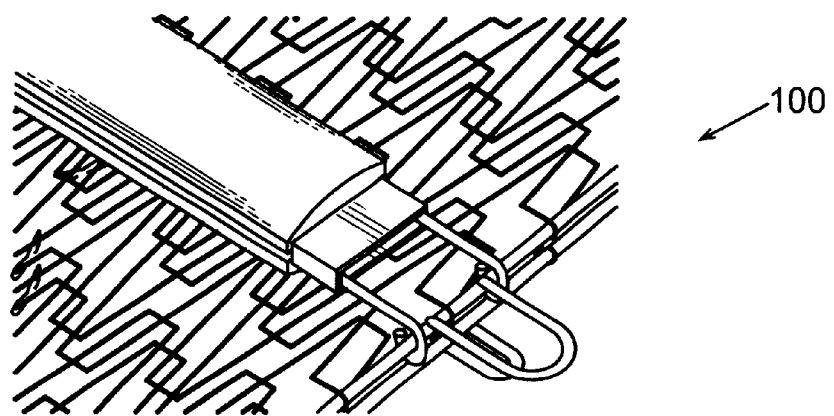
FIG. 19 is a cutaway, perspective view of the embodiment of FIG. 18 showing detail of the handle assembly.

Reference will now be made in detail to the description of the removable handle for use with grilling implements as illustrated in the drawings. While the removable handle for use with grilling implements will be described in connection with these drawings, there is no intent to limit it to the embodiment or embodiments disclosed therein. On the contrary, the intent is to cover all alternatives, modifications and equivalents included within the spirit and scope of the removable handle for use with grilling implements as defined by the appended claims.

DETAILED DESCRIPTION

The present invention comprises a handle assembly which can be adapted for use with a variety of cookware such as, cooking baskets, skillets, woks, baking pans, and other such devices. The various cookware items typically come with a fixed handle that extends radially from the cookware item. As such the packaging must be relatively large for shipping the item to a retail outlet or to a consumer. Upon removal from the packaging by the consumer, the cookware item requires a large storage area in the home. The present invention teaches a handle that has an extended position for use and a folded position for shipping, cleaning, and storage. The invention also provides means for locking a cover for the cookware item in place during use. Without limiting the scope of the invention, the handle is described herein in connection with a basket assembly such as might be used on a barbecue grill.

Reference will now be made to the drawings wherein like reference numerals indicate corresponding parts throughout the several views. As shown in FIGS. 1 and 2, an embodiment of the basket 100 of the present invention includes a basket assembly 102 and a handle assembly 104. In FIGS. 1 and 2, basket assembly 102 is depicted in an open position. In the open position, panels 106 and 108 of the basket assembly are arranged so that the basket assembly can receive one or more food items that are to be placed between the panels of the basket assembly. As described in greater detail hereinafter, the food item(s) can be maintained between the panel of the basket assembly by arranging the panels in an overlying relationship with each other and securing the panels in a closed position.

Although capable of being formed in various configurations, each panel of the basket assembly is depicted in FIG. 1 as comprising a perimeter wire 120 that forms a frame for a series of cross wires 122. In FIG. 1, each cross wire 122 is fixedly attached at each of its ends to the perimeter wire. One or more intermediate portions of each of the cross wires can be affixed to the perimeter wire and/or to an adjacent cross wire. For example, spring wires 124 are used to affix portions of the wires to each other. So provided, the spring wires maintain the cross wires in relatively close proximity to each other while enabling the various wires of the panel to deflect. More specifically, the wires can deflect in response to engaging a food item that is placed between the panels of the basket assembly. The spring wires also prevent the cross wires from deflecting to such a degree that food items can easily fall out of the basket assembly.

Cross wires from each panel can be formed in various shapes. In FIG. 1, the cross wires take on a generally zigzag configuration. This particular configuration enables a portion of a cross wire to nest within a portion of an adjacent cross wire, thereby providing voids between the cross wires that are sufficiently small so as to retain relatively small food items between the panels when the basket assembly is in its closed position. A more detailed view of representative cross wires and spring wires is depicted in FIG. 4.

In some embodiments, the various wires of the basket assembly can be formed of metal, such as cold rolled steel. Additionally, the material of the basket assembly can be finished with a non-stick coating. Since it is intended that the basket 100 be primarily used with food products, the various exterior surfaces of the basket should be compatible for use with food products.

Figure 23:
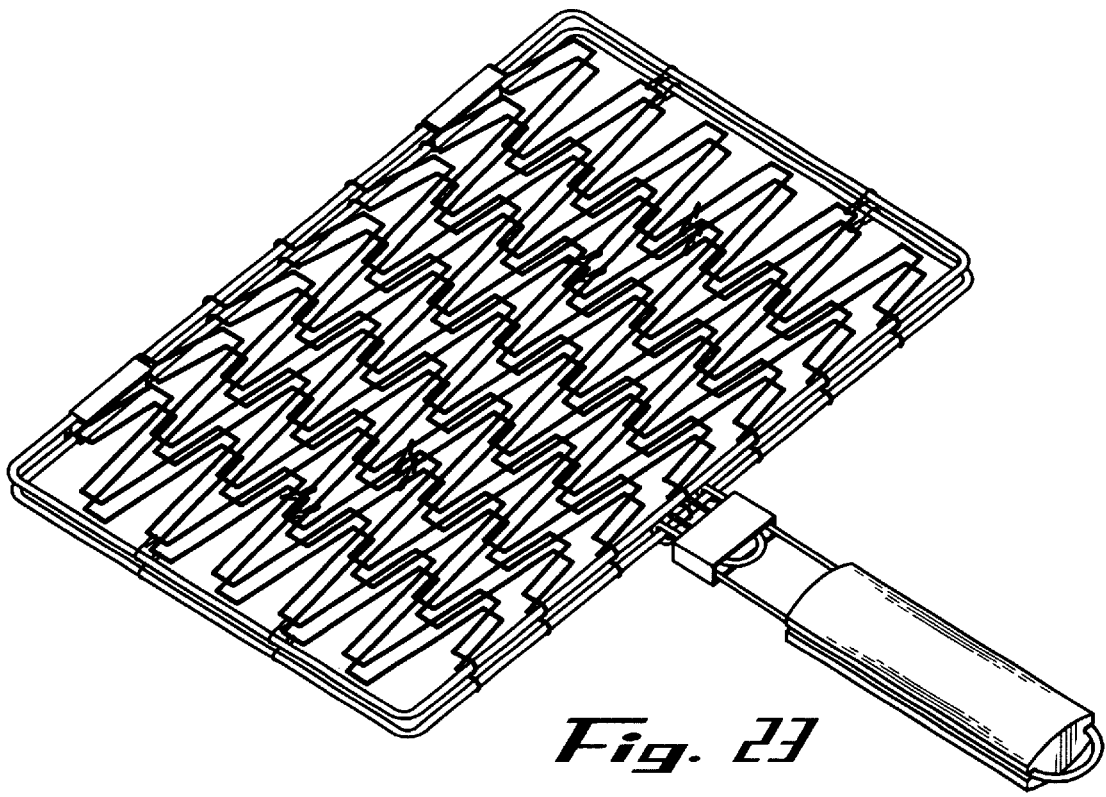
FIG. 23 is a perspective view of the embodiment of FIGS. 18 through 22 with the basket in a closed position.

Panels 106 and 108 of the basket assembly of FIG. 1 are hingedly attached to each other so that they are able to move between the open position (depicted in FIG. 1) and a closed position (depicted in FIG. 23). A hinge mechanism 130 engages each of the panels and facilitates hinged attachment of the panels, e.g., hinged attachment to each other. Shown in greater details in FIGS. 8 and 9, hinge mechanism can be a clip that is shaped to capture corresponding portions of the perimeter wire of each panel. Although only one hinge mechanism may be required, multiple hinge mechanisms can be used in some embodiments so that twisting of the basket assembly when moving the panels between their various positions is reduced.

Each panel includes one of a handle locking member 140 and a basket locking member 142. In FIG. 1, handle locking member 140 engages panel 106 and basket locking member 142 engages panel 108. As described in greater detail hereinafter, the handle locking member 140 facilitates securing of the handle in its extended position, and the basket locking member facilitates securing of the basket assembly in its closed position.

The handle assembly 104, shown in FIG. 1 and in greater detail in FIGS. 10–17, includes an attachment mechanism 150 and a gripping member 152. Attachment member 150 is adapted to facilitate engagement of the handle assembly with one of the panels. In the embodiment of FIG. 1, the handle assembly rotatably engages a panel so that the handle can be rotated between an extended position (depicted in FIG. 1), and a retracted position (depicted in FIG. 18). Attachment mechanism 150 can be formed in various shapes and of various materials. For example, in the embodiments depicted in the accompanying figures, attachment mechanism 150 is provided as a wire loop that is adapted to secure gripping member 152. Additionally, the wire loop is adapted to rotatably engage a perimeter wire of a panel at its ends 154.

As shown in FIGS. 13–15, gripping member 152 includes longitudinal recesses 156 and 158 that are adapted to receive a portion of the attachment mechanism. Gripping member 152 can be formed of various materials, e.g., wood, and is provided to facilitate secure grasping of the handle by a user.

Referring now to FIG. 3 and FIGS. 5–7, the locking mechanism will be described in greater detail. In FIGS. 3, 5 and 7, locking mechanism 160 is formed as a clip that is adapted to engage about a portion of the attachment mechanism. In particular, locking mechanism 160 includes an engagement portion 162 that is adapted to engage about the wire loop of the handle assembly. Additionally, the locking mechanism is adapted to slide along the attachment member and capture one or more components of the basket assembly to facilitate securing of the handle assembly in its extended position as well as locking the basket assembly in the closed position. In order to facilitate moving the locking mechanism between its various positions, a protrusion 164 can be provided that extends from the engagement member. So provided, the protrusion provides a convenience surface by which a user may manipulate the position of the locking mechanism, e.g., the protrusion can be engaged by a thumb of the user.

Referring now to FIGS. 18–24, operation of an embodiment of the basket will be described in greater detail. In FIG. 18, basket 100 is depicted in a stored configuration. In particular, panels of the basket assembly are arranged in the closed position and the handle assembly is rotated to its retracted position. So positioned, convenient storage of the basket is accommodated as the various components of the basket require a minimal amount of storage space. This configuration is shown in greater detail in FIG. 19. Note, in FIG. 19, that the handle and basket locking members are aligned with each other in a generally nested configuration.

Figure 20:
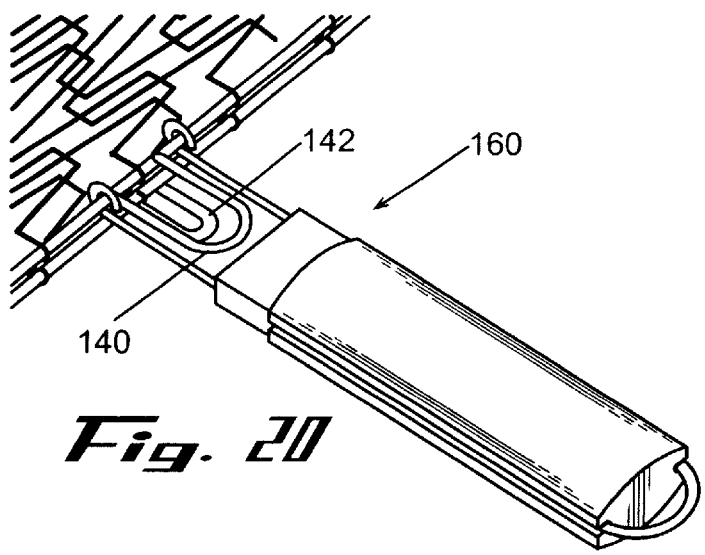
FIG. 20 is a cutaway, perspective view of the embodiment of FIG. 18, with the handle assembly moved to an extended position.

In FIG. 20, the handle assembly has been rotated to its extended position. The locking mechanism, however, is in a release position so that the handle assembly is still free to rotate relative to the panel to which it is attached. Also, the panels are able to be moved to either the open or closed position.

Figure 21:
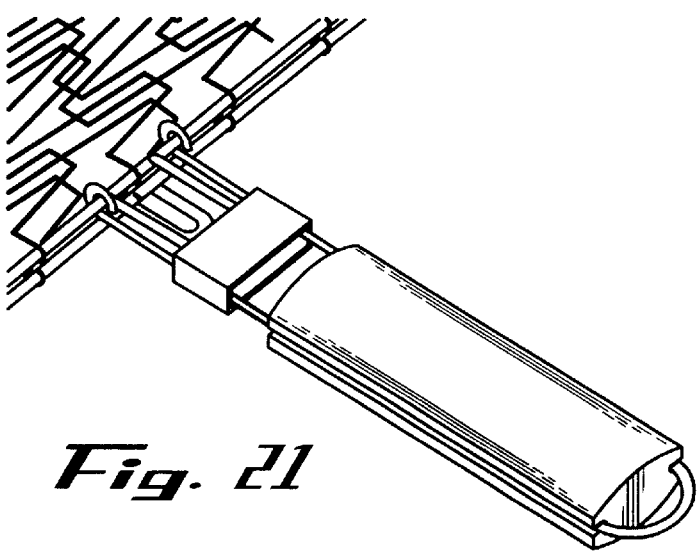
FIG. 21 is a cutaway, perspective view of the embodiment of FIGS. 18 through 20, with the locking mechanism in a first locking position.

In FIG. 21, the locking mechanism is moved to a first locking position. In the first locking position, the locking mechanism captures the handle locking member. This configuration prevents the handle assembly from rotating relative to the panel.

Figure 22:
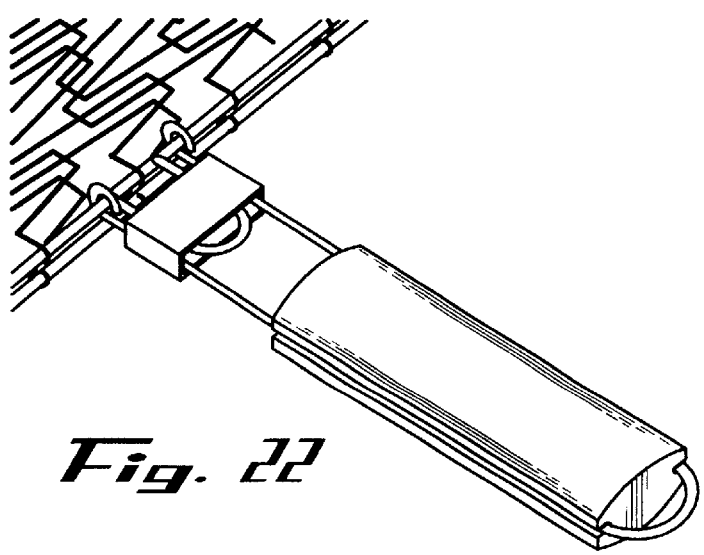
FIG. 22 is a cutaway, perspective view of the embodiment of FIGS. 18 through 21 showing detail of the handle assembly, with the locking mechanism moved to a second locking position.

In FIG. 22, the locking mechanism has been moved to a second locking position. In this configuration, both the handle and the basket locking members are captured by the locking mechanism. Therefore, in addition to the handle assembly being prevented from rotating relative to the panel, the panels are maintained in their closed position. This configuration also is depicted in FIG. 23.

Figure 24:
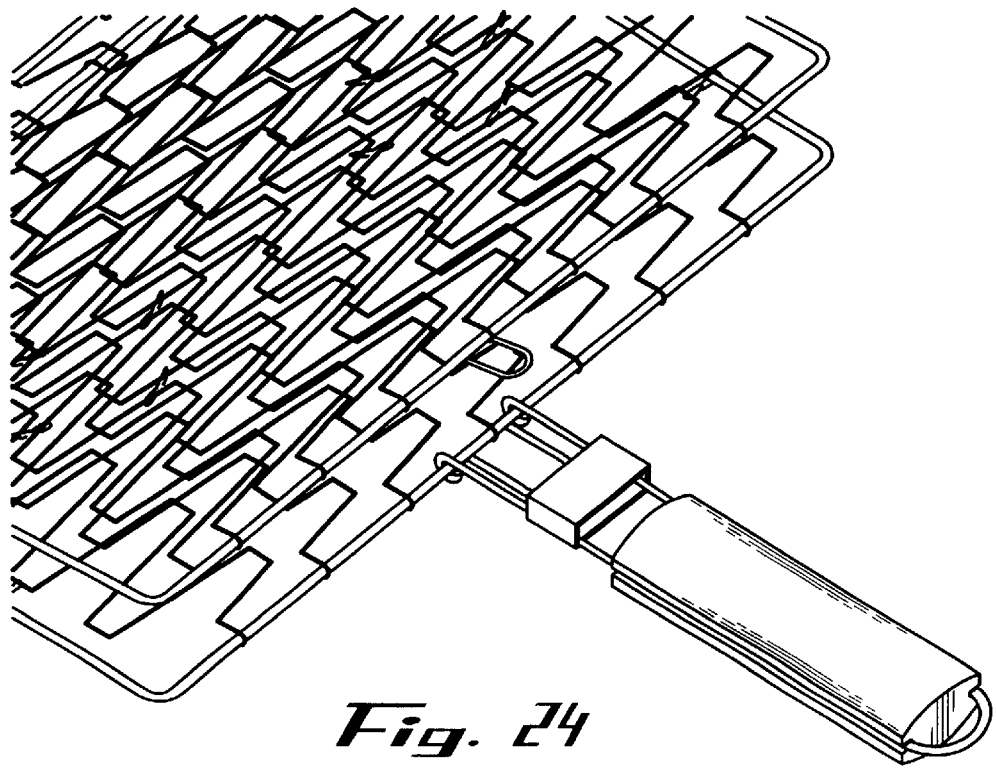
FIG. 24 is a perspective view of the embodiment of FIGS. 18 through 23 showing the locking mechanism moved to its first locking position and a panel of the basket being moved toward the open position.

In FIG. 24, the locking mechanism is moved back to its first locking position. Thus, in FIG. 24, it is depicted that the second locking member is no longer captured by the locking mechanism, and that the panel can be rotated to its open position.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

We claim:

1. A handle for use with a cookware item, comprising:
   an attachment member having a proximal end and a distal end, said proximal end being rotatably secured to a first portion of said cookware item;
   a gripping member disposed on said distal end;
   a handle locking member disposed on said first portion;
   a locking mechanism slidably disposed on said attachment member between said gripping member and said proximal end, said locking mechanism being arranged and configured to engage said handle locking member and being slidable between a first position and a second position; and
   wherein when said locking mechanism is in said first position, said handle is rotatable relative to said first portion, and when said locking mechanism is in said second position, said locking mechanism engages said handle locking member, thereby securing said handle relative to said cookware item.

2. The handle of claim 1, wherein:
   said cookware item further comprises a second portion and a basket locking member disposed on said second portion, said first and second portions being hingably attached and rotatable between an open and a closed position; and
   said locking mechanism further includes a third position wherein said locking mechanism engages both said handle locking member and said basket locking member, thereby securing said first and second portions in said closed position.

3. The handle of claim 2, wherein said gripping portion is comprised of wood.

4. The handle of claim 2, wherein said gripping portion is comprised of plastic.

5. The handle of claim 2, wherein:
   said distal end of said attachment member is a substantially u-shaped wire loop;
   said gripping member further includes a pair of longitudinal recesses arranged and configured to receive said wire loop; and
   wherein said wire loop extends beyond said gripping portion.

6. The handle of claim 5, wherein said gripping portion has a substantially oval-shaped cross-section.

7. The handle of claim 2, wherein said cooking item further comprises a basket.

8. The handle of claim 7, wherein said basket is comprised of cold rolled steel.

9. The handle of claim 1, wherein said attachment member further comprises a substantially u-shaped first wire loop, said handle locking member further comprises a substantially u-shaped second wire loop, and wherein said second wire loop is disposed within said first wire loop when said locking mechanism is in said second position.

10. A cookware item with a rotatable handle, comprising:
    a first and second portion being rotatably attached between an open and a closed position by a hinge mechanism;
    said handle comprising:
        an attachment member having a proximal end and a distal end, said proximal end being rotatably secured to said first portion;
        a handle locking member disposed on said first portion adjacent said proximal end;
        a basket locking member disposed on said second portion such that said basket locking member is adjacent both said proximal end and said handle locking member when said cookware item is in said closed position;
        a locking mechanism slidably disposed on said attachment member between said proximal end and said distal end, said locking mechanism being slidable between a first position, a second position, and a third position; and
        wherein when said cookware item is in said closed position, placing said locking mechanism in said first position allows said handle to be rotated relative to said first portion, placing said locking mechanism in said second position causes said locking mechanism to engage said handle locking member, thereby securing said handle in a locked position relative to said first portion, and placing said locking mechanism in said third position causes said locking mechanism to engage both said handle locking mechanism and said basket locking mechanism, thereby both securing said handle in said locked position and securing said cookware item in said closed position.

11. The cookware item of claim 10, further comprising a gripping portion disposed on said distal end of said attachment member.

12. The cookware item of claim 11, wherein said cookware item further comprises a basket and said gripping portion is comprised of wood.

* * * * *